(12) United States Patent
Wilson et al.

(10) Patent No.: US 8,022,817 B2
(45) Date of Patent: *Sep. 20, 2011

(54) TIRE WITH MONITORING DEVICE

(75) Inventors: Paul B. Wilson, Tallmadge, OH (US);
Russell W. Koch, Hartville, OH (US);
Robert J. Trew, Cary, NC (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/563,811

(22) Filed: Sep. 21, 2009

(65) Prior Publication Data

US 2010/0007477 A1    Jan. 14, 2010

Related U.S. Application Data

(63) Continuation of application No. 11/593,687, filed on Nov. 7, 2006, now Pat. No. 7,592,902, which is a continuation of application No. 11/155,233, filed on Jun. 17, 2005, now Pat. No. 7,132,930, which is a continuation of application No. 09/793,253, filed on Feb. 26, 2001, now Pat. No. 6,919,799, which is a continuation-in-part of application No. 09/301,793, filed on Apr. 29, 1999, now Pat. No. 6,208,244.

(51) Int. Cl.
*B60R 25/10* (2006.01)

(52) U.S. Cl. ............... 340/426.33; 340/442; 340/443; 340/444; 340/447; 73/146.5

(58) Field of Classification Search ............ 340/426.33, 340/442, 443, 444, 445, 446, 447; 73/146.5, 73/146

See application file for complete search history.

(56) References Cited

U.S. PATENT DOCUMENTS

| 2,274,557 | A | 2/1942 | Morgan et al. |
| 3,614,732 | A | 10/1971 | Lejeune |
| 3,705,365 | A | 12/1972 | Szabo et al. |
| 3,806,869 | A | 4/1974 | Davis, Jr. |
| 3,806,905 | A | 4/1974 | Strenglein |

(Continued)

FOREIGN PATENT DOCUMENTS

EP    0505905    9/1992

(Continued)

OTHER PUBLICATIONS

Steven R. Best, Antenna Polarization Considerations, Wireless Design & Development, Nov. 1998, 2 pages, Wireless Design & Development.

(Continued)

*Primary Examiner* — Daryl Pope

(57) ABSTRACT

The invention provides a monitoring device and tire combination wherein an antenna is mounted to the tire in a location spaced from the monitoring device. In one embodiment, the antenna may be mounted to the tire sidewall outside the body cords of the tire. The antenna may be mounted on the outer surface of the sidewall or embedded within the body of the sidewall. The antenna is connected to the monitoring device with a connector. The connector may be electrically coupled to the monitoring device or may be connected to the monitoring device with a plug and socket connection. When the antenna is outside the body cord, the connector may extend from the antenna through the bead filler, over the top of the turn up, or under the bead ring.

25 Claims, 7 Drawing Sheets

U.S. PATENT DOCUMENTS

| | | | |
|---|---|---|---|
| 4,010,354 A | 3/1977 | Apicella, Jr. et al. |
| 4,067,235 A | 1/1978 | Markland et al. |
| 4,075,603 A | 2/1978 | Snyder et al. |
| 4,103,283 A | 7/1978 | Lee |
| 4,110,732 A | 8/1978 | Jarocha et al. |
| 4,137,520 A | 1/1979 | Deveau |
| 4,160,234 A | 7/1979 | Karbo et al. |
| 4,237,728 A | 12/1980 | Betts et al. |
| 4,311,985 A | 1/1982 | Gee et al. |
| 4,319,220 A | 3/1982 | Pappas et al. |
| 4,334,215 A | 6/1982 | Frazier et al. |
| 4,384,482 A | 5/1983 | Snyder |
| 4,409,586 A | 10/1983 | Hochstein |
| 4,459,595 A | 7/1984 | Kramer et al. |
| 4,494,106 A | 1/1985 | Smith et al. |
| 4,570,152 A | 2/1986 | Melton et al. |
| 4,578,992 A | 4/1986 | Galasko et al. |
| 4,588,978 A | 5/1986 | Allen |
| 4,609,905 A | 9/1986 | Uzzo |
| 4,695,823 A | 9/1987 | Vernon |
| 4,717,905 A | 1/1988 | Morrison, Jr. et al. |
| 4,816,839 A | 3/1989 | Landt |
| 4,845,649 A | 7/1989 | Eckardt et al. |
| 4,851,809 A | 7/1989 | McAlister |
| 4,862,486 A | 8/1989 | Wing et al. |
| 4,911,217 A | 3/1990 | Dunn et al. |
| 4,920,345 A | 4/1990 | Lissel et al. |
| 5,181,975 A | 1/1993 | Pollack et al. |
| 5,196,845 A | 3/1993 | Myatt |
| 5,218,861 A | 6/1993 | Brown et al. |
| 5,223,851 A | 6/1993 | Hadden et al. |
| 5,231,872 A | 8/1993 | Bowler et al. |
| 5,235,850 A | 8/1993 | Schurmann |
| 5,285,189 A | 2/1994 | Nowicki et al. |
| 5,319,354 A | 6/1994 | Myatt |
| 5,348,067 A | 9/1994 | Myatt |
| 5,413,159 A | 5/1995 | Olney et al. |
| 5,436,612 A | 7/1995 | Aduddell |
| 5,479,171 A | 12/1995 | Schuermann |
| 5,483,826 A | 1/1996 | Schultz et al. |
| 5,483,827 A | 1/1996 | Kulka et al. |
| 5,500,065 A | 3/1996 | Koch et al. |
| 5,520,231 A | 5/1996 | Myatt |
| 5,531,109 A | 7/1996 | Tsagas |
| 5,559,484 A | 9/1996 | Nowicki et al. |
| 5,562,787 A | 10/1996 | Koch et al. |
| 5,573,610 A | 11/1996 | Koch et al. |
| 5,573,611 A | 11/1996 | Koch et al. |
| 5,583,482 A | 12/1996 | Chamussy et al. |
| 5,600,301 A | 2/1997 | Robinson, III |
| 5,731,754 A | 3/1998 | Lee, Jr. et al. |
| 5,743,973 A | 4/1998 | Krishnan et al. |
| 5,749,984 A | 5/1998 | Frey et al. |
| 5,790,016 A | 8/1998 | Konchin et al. |
| 5,824,891 A | 10/1998 | Monson |
| 5,883,305 A | 3/1999 | Jo et al. |
| 5,898,047 A | 4/1999 | Howald et al. |
| 5,936,155 A | 8/1999 | Francois et al. |
| 5,960,844 A | 10/1999 | Hamaya |
| 5,969,239 A | 10/1999 | Tromeur et al. |
| 5,970,393 A | 10/1999 | Khorrami et al. |
| 5,971,046 A | 10/1999 | Koch et al. |
| 5,977,870 A | 11/1999 | Rensel et al. |
| 6,030,478 A | 2/2000 | Koch et al. |
| 6,034,597 A | 3/2000 | Normann et al. |
| 6,049,278 A | 4/2000 | Guthrie et al. |
| 6,062,072 A | 5/2000 | Mock et al. |
| 6,082,192 A | 7/2000 | Koch et al. |
| 6,087,930 A | 7/2000 | Kulka et al. |
| 6,101,870 A | 8/2000 | Kato et al. |
| 6,112,585 A | 9/2000 | Schrottle et al. |
| 6,161,430 A | 12/2000 | Koch et al. |
| 6,169,480 B1 | 1/2001 | Uhl et al. |
| 6,192,746 B1 | 2/2001 | Wilson |
| 6,194,999 B1 | 2/2001 | Uhl et al. |
| 6,208,244 B1 | 3/2001 | Wilson et al. |
| 6,244,104 B1 | 6/2001 | Koch et al. |
| 6,255,940 B1 | 7/2001 | Phelan et al. |
| 6,309,494 B1 | 10/2001 | Koch et al. |
| 6,312,539 B1 | 11/2001 | Bohm et al. |
| 6,360,594 B1 | 3/2002 | Koch et al. |
| 6,371,178 B1 | 4/2002 | Wilson |
| 6,386,251 B1 | 5/2002 | Koch et al. |
| 6,386,254 B1 | 5/2002 | Koch et al. |
| 6,388,567 B1 | 5/2002 | Bohm et al. |
| 6,438,193 B1 | 8/2002 | Ko et al. |
| 6,443,198 B1 | 9/2002 | Koch et al. |
| 6,444,069 B1 | 9/2002 | Koch et al. |
| 6,474,380 B1 | 11/2002 | Rensel et al. |
| 6,477,894 B1 | 11/2002 | Koch et al. |
| 6,546,982 B1 | 4/2003 | Brown et al. |
| 6,580,363 B1 | 6/2003 | Wilson |
| 6,624,748 B1 | 9/2003 | Phelan et al. |
| 6,653,936 B2 | 11/2003 | Bohm et al. |
| 6,688,353 B1 | 2/2004 | Koch |
| 6,705,365 B1 | 3/2004 | Wilson |
| 6,725,713 B2 | 4/2004 | Adamson et al. |
| 6,860,303 B2 | 3/2005 | Rensel et al. |
| 6,885,291 B1 | 4/2005 | Pollack et al. |
| 6,919,799 B2 | 7/2005 | Wilson et al. |
| 7,132,930 B2 | 11/2006 | Wilson et al. |
| 7,592,902 B2 * | 9/2009 | Wilson et al. ............ 340/426.33 |

FOREIGN PATENT DOCUMENTS

| | | |
|---|---|---|
| EP | 0505906 | 9/1992 |
| EP | 0906839 | 4/1999 |
| EP | 0936089 | 8/1999 |
| EP | 1048494 | 11/2000 |
| WO | 90/12474 | 10/1990 |
| WO | 99/29523 | 6/1999 |
| WO | 99/29524 | 6/1999 |
| WO | 99/29525 | 6/1999 |
| WO | 99/53740 | 10/1999 |
| WO | 00/07834 | 2/2000 |
| WO | 00/08598 | 2/2000 |
| WO | 01/66368 | 9/2001 |

OTHER PUBLICATIONS

Michael M. Ollivier, TIRIS: A Vehicle Tracking System Using Passive Radio Transponders, 1993, 8 pages, The Institution of Electrical Engineers, Savoy Place, London, United Kingdom.

Russell W. Koch et al., Patch for Preparing an Innerliner of a Pneumatic Tire for the Quick Bonding of an Electronic Monitoring Device, U.S. Appl. No. 09/206,273, filed Jun. 1, 1998, 34 pages, United States.

* cited by examiner

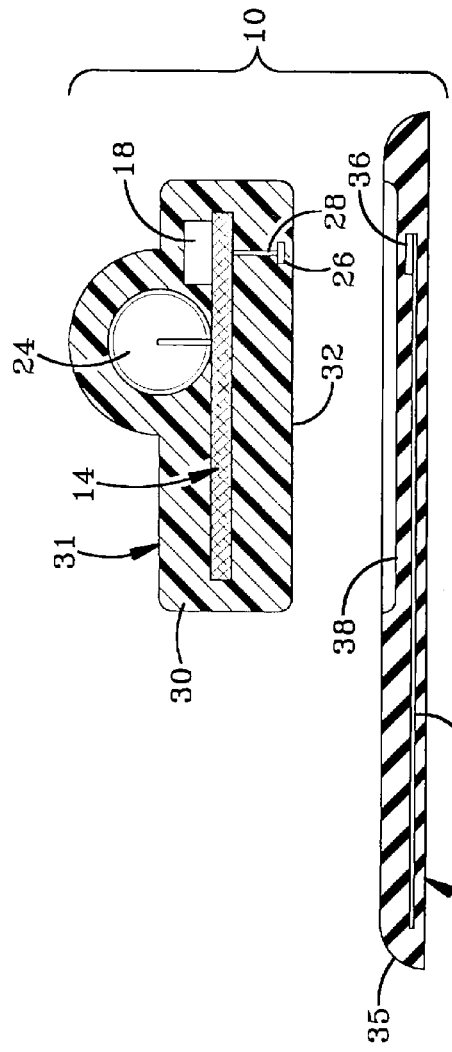
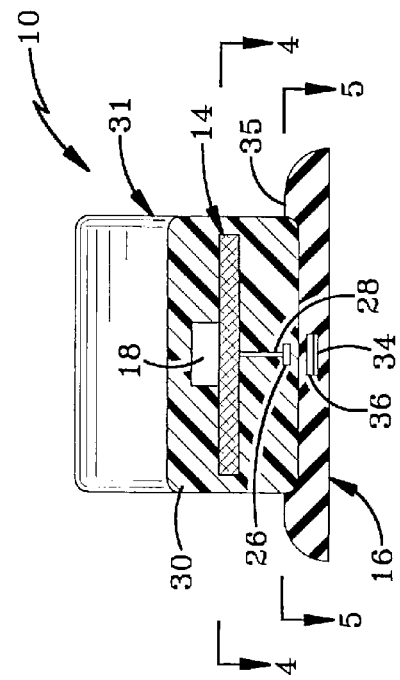
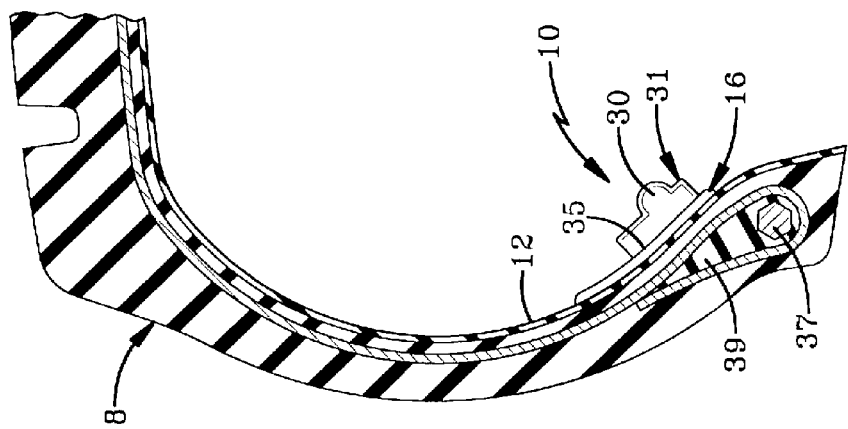

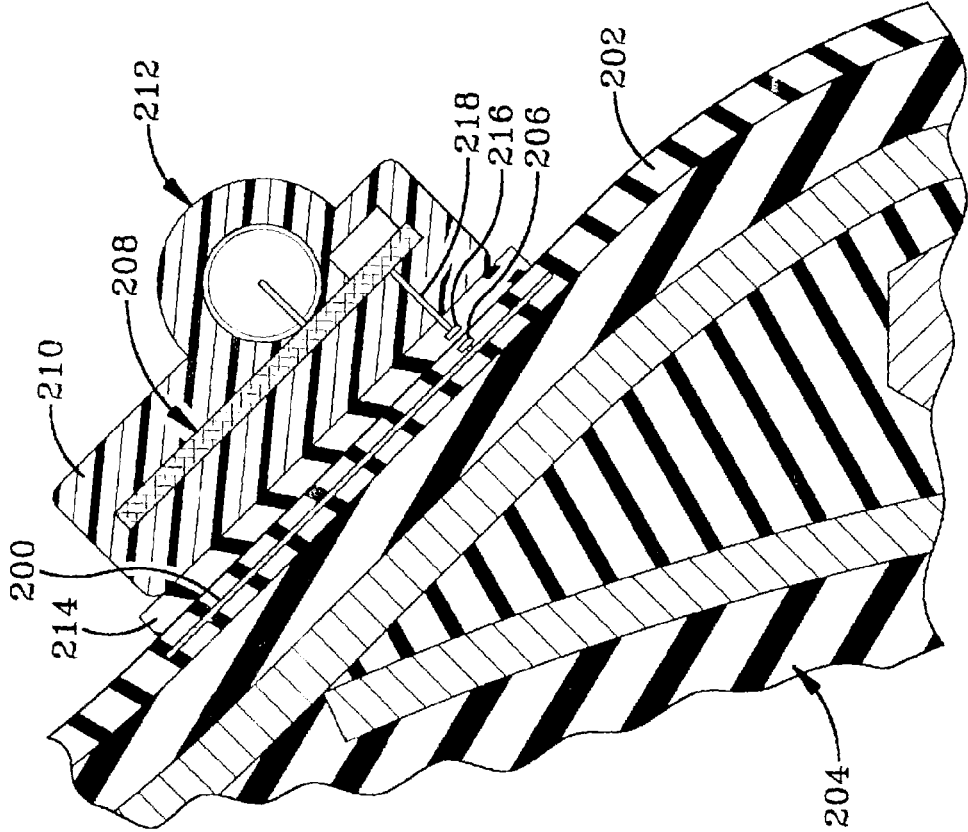

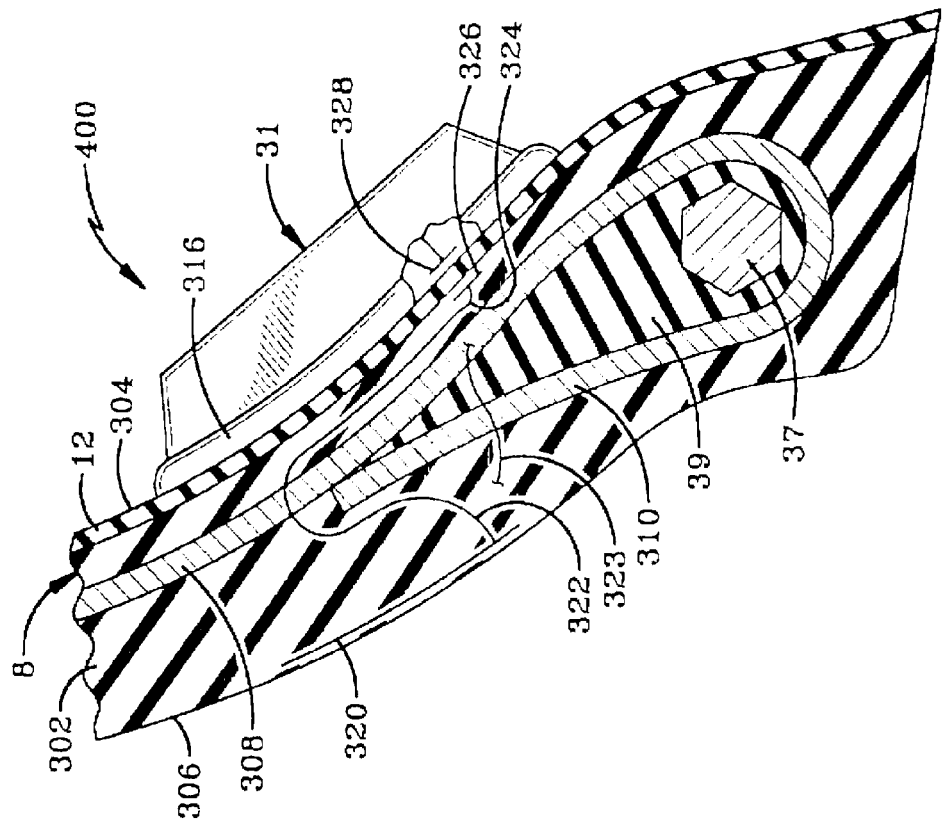
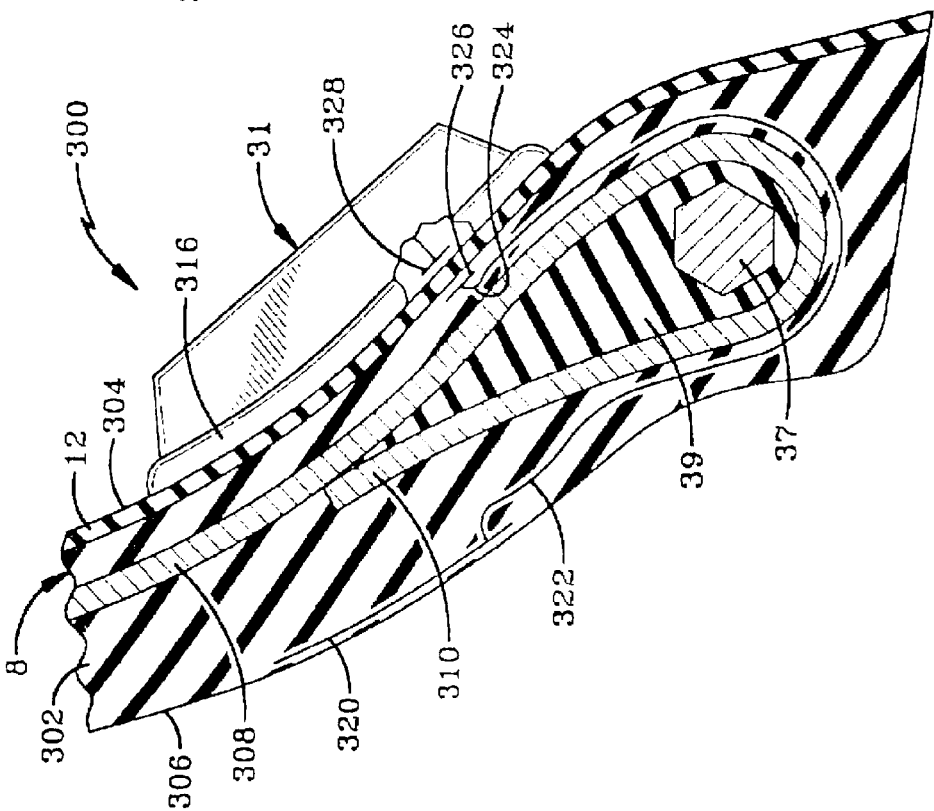

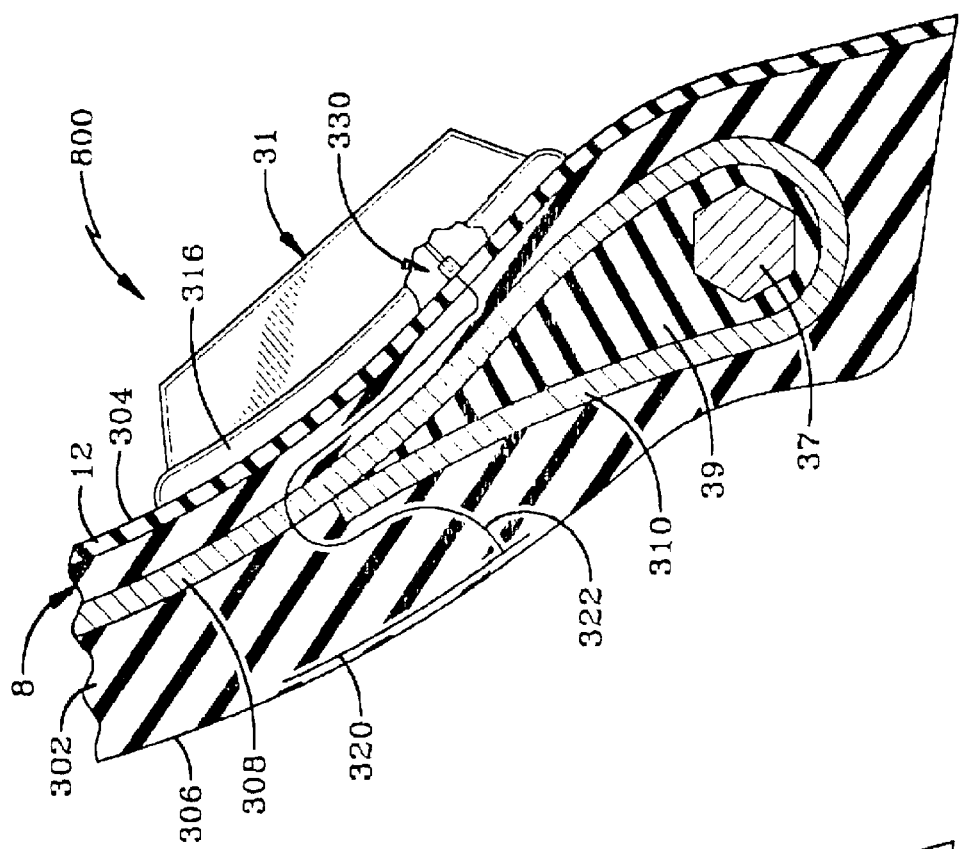
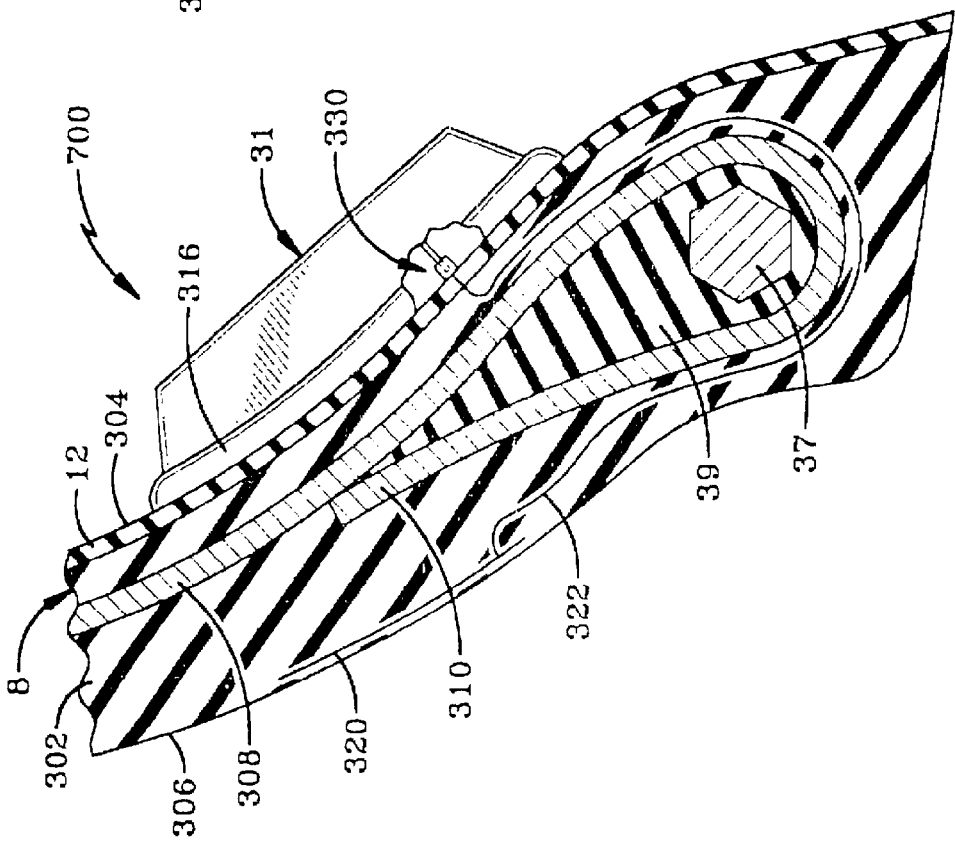

TIRE WITH MONITORING DEVICE

CROSS REFERENCE TO RELATED APPLICATIONS

This application is a continuation application claiming priority to U.S. patent application Ser. No. 11/593,687 filed Nov. 7, 2006 now U.S. Pat. No. 7,592,902, which is a continuation application Ser. No. 11/155,233 filed Jun. 17, 2005 claiming priority from U.S. Pat. No. 7,132,930 which is a continuation of application Ser. No. 09/793,253, filed Feb. 26, 2001, now U.S. Pat. No. 6,919,799, which is a continuation-in-part of application Ser. No. 09/301,793, filed Apr. 29, 1999, now U.S. Pat. No. 6,208,244; the disclosures of each are incorporated herein by reference.

BACKGROUND OF THE INVENTION

1. Technical Field

The present invention generally relates to the combination of a monitoring device and a pneumatic tire. More particularly, the present invention relates to a pneumatic tire and monitoring device combination wherein the antenna for the monitoring device is spaced from the monitoring device. Specifically, the antenna is mounted outside the body cords and connected to the monitoring device with a connector that is coupled to or directly connected to the monitoring device.

2. Background Information

Various industries and users want to actively monitor at least one engineering condition of a tire while the tire is installed and in use on a vehicle. Typical desirable measurements are internal temperature and pressure. These measurements are preferably gathered without having to remove the tire from the vehicle or specially positioning the tire to gather the data. Numerous types of monitoring devices are known in the art to perform these measurements. One type of monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active self-powered programmable electronic devices are disclosed in U.S. Pat. Nos. 5,573,610, 5,562,787, and 5,573,611 which are assigned to the assignee of the present application.

Each of the active self-powered programmable electronic devices includes an antenna that is used to transmit the data created by the monitoring device to the data gathering device positioned outside of the tire. One of the problems in the art is to position the antenna such that the data created by the monitoring device is accurately transmitted to the data gathering device outside of the tire. It is desired to position the antenna as close to the outside of the pneumatic tire as possible so that the transmissions pass through as little of the tire as possible. In the past, the antenna of the monitoring device generally extended into the interior chamber of the tire such that the radio waves had to pass first through the air inside the tire, through the innerliner, through the tire sidewall, and then through the air to the data gathering device. It is desired in the art to provide an antenna for an active, self-powered programmable electronic device that is positioned so that the radio waves do not have to first pass through the inner chamber of the tire before entering the tire sidewall. The bead ring and apex filler of the tire tend to block the radio transmission from the monitoring device. It is thus desired in the art to position the antenna away from the bead ring and apex filler so that the transmission through the tire sidewall is as strong as possible.

On the other hand, it is also desirable to position the monitoring device as close to the bead ring as possible because that area of the tire sidewall experiences fewer forces and stretching than the middle portion of the tire sidewall. It is thus desired in the art to provide a method for attaching the antenna to the monitoring device that accommodates the ideal position for both elements.

The monitoring devices known in the art are typically encapsulated with an encapsulation material that provides structural support to the monitoring device so that the device is not destroyed by the forces normally encountered and experienced by a pneumatic tire. In some applications, the process of encapsulation will take into account that the antenna must extend from the encapsulated monitoring device. It is desired to provide a monitoring device configuration that eliminates this encapsulation problem by positioning the antenna apart from the monitoring device.

One method of connecting the monitoring device to the innerliner of a tire includes the use of a rubber attachment patch to carry the monitoring device with the inner surface of the rubber patch being configured to securely adhere to the innerliner of a tire. It is desired that the sensitive electronic monitoring device and the rubber patch be capable of being manufactured in separate locations and assembled when the monitoring device is attached to the innerliner of a tire. Separating the rubber attachment patch and the sensitive monitoring device also allows the rubber attachment patch to be aggressively attached to the innerliner of a tire without the risk of damaging the sensitive monitoring device. After the rubber attachment patch is securely anchored to the innerliner, the monitoring device may be attached to the patch.

SUMMARY OF THE INVENTION

The invention provides a monitoring device and tire combination wherein an antenna is mounted to the tire in a location spaced from the monitoring device. In one embodiment, the antenna may be mounted to the tire sidewall outside the body cords of the tire. The antenna may be mounted on the outer surface of the sidewall or embedded within the body of the sidewall. The antenna is connected to the monitoring device with a connector. The connector may be electrically coupled to the monitoring device or may be connected to the monitoring device with a plug and socket connection. When the antenna is outside the body cord, the connector may extend from the antenna through the bead filler, over the top of the turn up, or under the bead ring.

BRIEF DESCRIPTION OF THE DRAWINGS

FIG. 1 is a partial sectional view of a pneumatic tire with the monitoring device and patch combination connected to the innerliner of the pneumatic tire.

FIG. 2 is a sectional side view of the monitoring device and patch combination of the present invention.

FIG. 3 is a sectional end view of the monitoring device and patch combination showing the alignment of the first electrical pad with the second electrical pad.

FIG. 8 is a sectional view similar to FIGS. 6 and 7 showing a second alternative embodiment of the present invention.

FIG. 9 is a sectional view of the tire sidewall depicting a third alternative embodiment of the invention.

FIG. 10 is a sectional view of the tire sidewall depicting a fourth alternative embodiment of the invention.

FIG. 13 is a sectional view of the tire sidewall depicting a seventh alternative embodiment of the invention.

FIG. 14 is a sectional view of the tire sidewall depicting an eighth alternative embodiment of the invention.

Similar numerals refer to similar parts throughout the drawings.

DESCRIPTION OF THE PREFERRED EMBODIMENT

Figure 4:
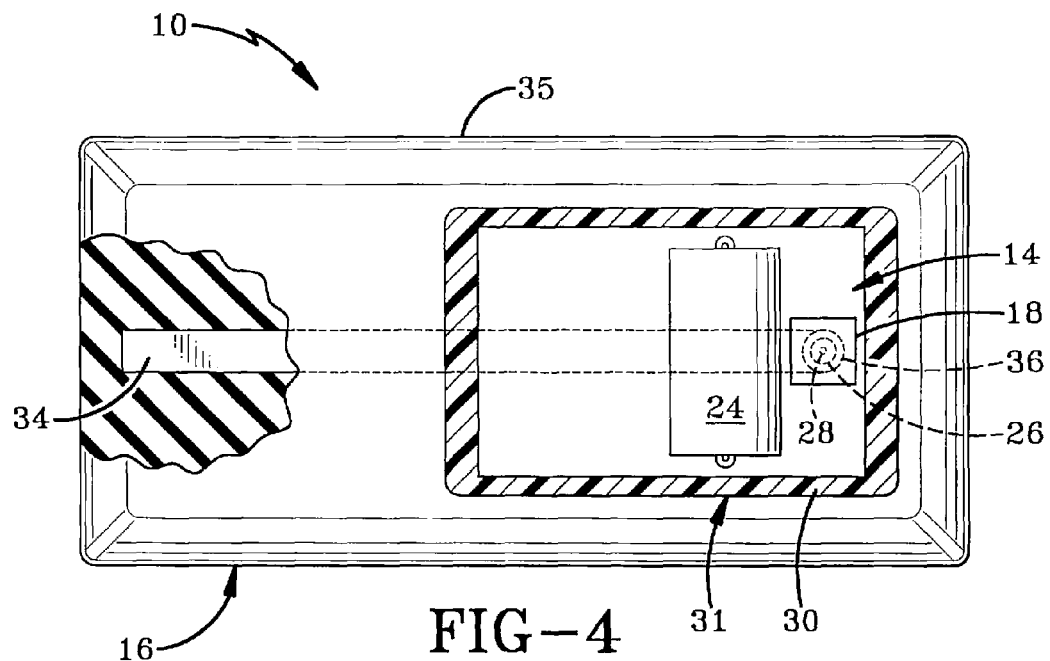
FIG. 4 is a sectional view taken along line 4-4, FIG. 3.
Figure 5:
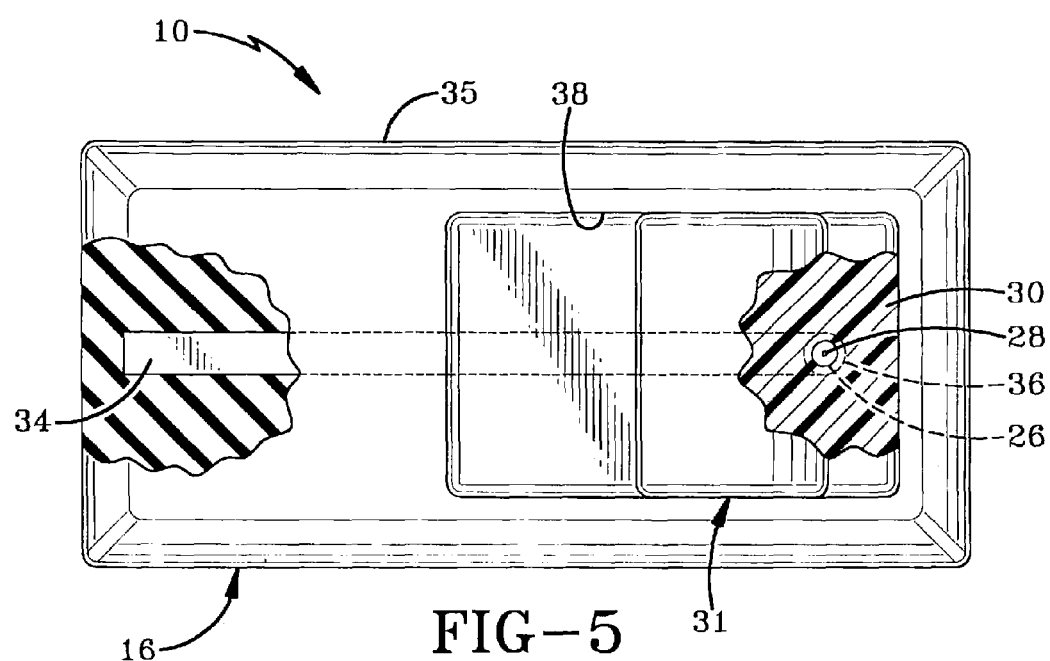
FIG. 5 is a fragmentary sectional view taken along line 5-5, FIG. 3 showing a portion of the encapsulated monitoring device in section and a portion of the patch in section.

The first embodiment of the monitoring device and patch combination of the present invention is depicted in FIGS. 1-5 and is indicated generally by the numeral 10. Combination 10 is connected to an innerliner 12 of a pneumatic tire 8 as shown in FIG. 1. Combination 10 preferably is connected to innerliner 12 by an attachment that is known in the art, such as a suitable adhesive.

Combination 10 includes a monitoring device 14 and an attachment patch 16 that are fabricated separately. Monitoring device 14 includes at least one sensing element 18 that is configured and adapted to read at least one desired parameter or sense at least one desired engineering condition of pneumatic tire 8. Monitoring device 14 further includes a power source or battery 24 that supplies power to monitoring device 14. In addition to the devices discussed above, other examples of monitoring devices are shown in U.S. Pat. No. 5,573,610, the contents of which are incorporated herein by reference. Sensing element 18 is connected to a first electrical pad 26 by a suitable connector 28 such as a wire. Electrical pad 26 may be spaced from monitoring device 14 or may be an integral element of monitoring device 14.

Monitoring device 14 and first electrical pad 26 are preferably encapsulated by an encapsulation material 30 that serves to protect monitoring device 14. Encapsulation material 30 may be a suitable epoxy or plastic that provides a rigid structure around monitoring device 14 and electrical pad 26. Encapsulation material 30 forms an encapsulated monitoring device 31 that includes a bottom surface 32 that provides a mounting surface for encapsulated monitoring device 31. Bottom surface 32 has at least one portion that is substantially planar. First electrical pad 26 is substantially parallel to the planar portion of bottom surface 32 and is also adjacent to bottom surface 32, but is still completely surrounded by encapsulation material 30.

Patch 16 includes an antenna 34 embedded within the body of the patch. A second electrical pad 36 is connected to antenna 34 and is also embedded within patch 16. Patch 16 may be formed from a suitable rubber or combination of rubbers that are compatible with and provide desirable adhesion properties with innerliner 12. Patch 16 has a top surface 38 sized and adapted to receive encapsulated monitoring device 31 such that bottom surface 32 lies against top surface 38 when encapsulated monitoring device 31 is connected to patch 16. Second electrical pad 36 is adjacent to top surface 38 but spaced therefrom by the material of patch 16. Second electrical pad 36 may be integrally formed with antenna 34 and, in some embodiments of the invention, may simply be a portion of antenna 34 disposed where it may electrically couple through the material of patch 16. Antenna 34 may be any of a variety of suitable antennas such as a wire, a bar, a plate, or the like.

In accordance with one of the objectives of the present invention, patch 16 includes a foot portion 35 that extends away from top surface 38. Antenna 34 is embedded within foot portion 35 such that it is positioned away from encapsulated monitoring device 31. Foot portion 35 of patch 16 allows encapsulated monitoring device 31 to be positioned closer to the bead ring 37 and apex filler 39 of tire 8 than antenna 34. Such positioning allows the signals from antenna 34 to propagate around bead ring 37 and apex filler 39.

In accordance with another of the objectives of the present invention, first electrical pad 26 is aligned with second electrical pad 36 when encapsulated monitoring device 31 is mounted on patch 16. Although first and second electrical pads 26 and 36 are aligned, they remain spaced from each other by the intervening material of patch 16 and encapsulation material 30. Electrical pads 26 and 36 are close enough, however, to create an electrical coupling such that sensing element 18 is in communication with antenna 34. Such electrical coupling is known to those skilled in the art and allows a signal to be communicated between pads 26 and 36. Such alignment and spacing is in accordance with another objective of the present invention that allows encapsulated monitoring device 31 to be installed on patch 16 without requiring a direct physical electrical connection between antenna 34 and monitoring device 14.

Monitoring device 14 and patch 16 may be connected to innerliner 12 in the following manner. First, monitoring device 14 is provided with sensing element 18, first electrical pad 26, and connector 28. Monitoring device 14 is then encapsulated with encapsulation material 30 to entirely encapsulate monitoring device 14 and first electrical pad 26. Patch 16 is then fabricated with antenna 34 embedded within the body of patch 16. Antenna 34 is connected to second electrical pad 36 that is also embedded within the body of patch 16. The steps of fabricating device 31 and patch 16 may be performed at separate locations because no physical connection between antenna 34 and device 31 is required.

Pneumatic tire 8 is then selected having innerliner 12 where combination 10 is installed. Encapsulated monitoring device 31 first may be connected to patch 16 by aligning first electrical pad 26 with second electrical pad 36. Encapsulated monitoring device 31 is then connected to patch 16 by seating bottom surface 32 of encapsulated monitoring device 31 onto top surface 38 of patch 16. A suitable manner of connecting the two elements is used such as a suitable adhesive.

Device 31 and patch 16 are then connected to innerliner 12 by a suitable connector such as an adhesive. The connection of combination 10 to innerliner 12 thus does not require a direct physical electrical connection between antenna 34 and monitoring device 14. The alignment of electrical pads 26 and 36 and the resulting electrical coupling provides the necessary communication between antenna 34 and monitoring device 14.

Combination 10 may also be installed on pneumatic tire 8 by first connecting patch 16 to innerliner 12. Patch 16 may be aggressively stitched to innerliner 12 without the danger of damaging monitoring device 14 because monitoring device 14 is later connected to patch 16. After patch 16 is suitably connected to innerliner 12, monitoring device 14 is aligned with patch 16 as discussed above and connected by a suitable connector such as an adhesive. The communication between antenna 34 and monitoring device 14 is automatically created when electrical pads 26 and 36 are properly aligned, namely signal coupling is achieved between the antenna and monitoring device without any physical electrical connection therebetween.

Figure 7:
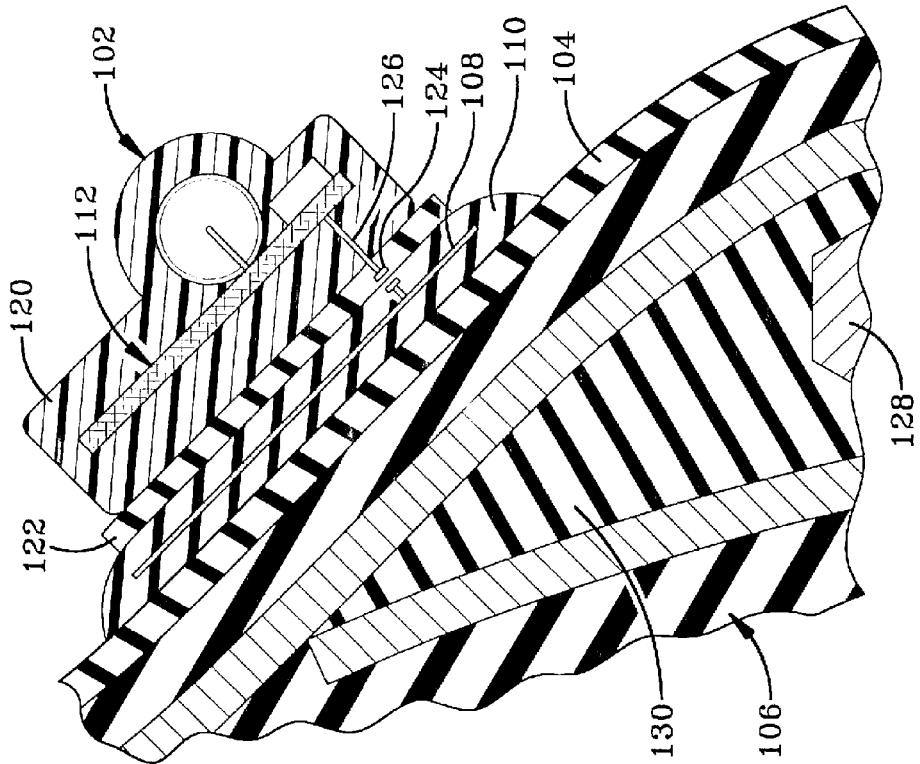
FIG. 7 is a sectional view similar to FIG. 6 showing the attachment of the monitoring device to the innerliner of a tire with the first alternative embodiment of the present invention.
Figure 6:
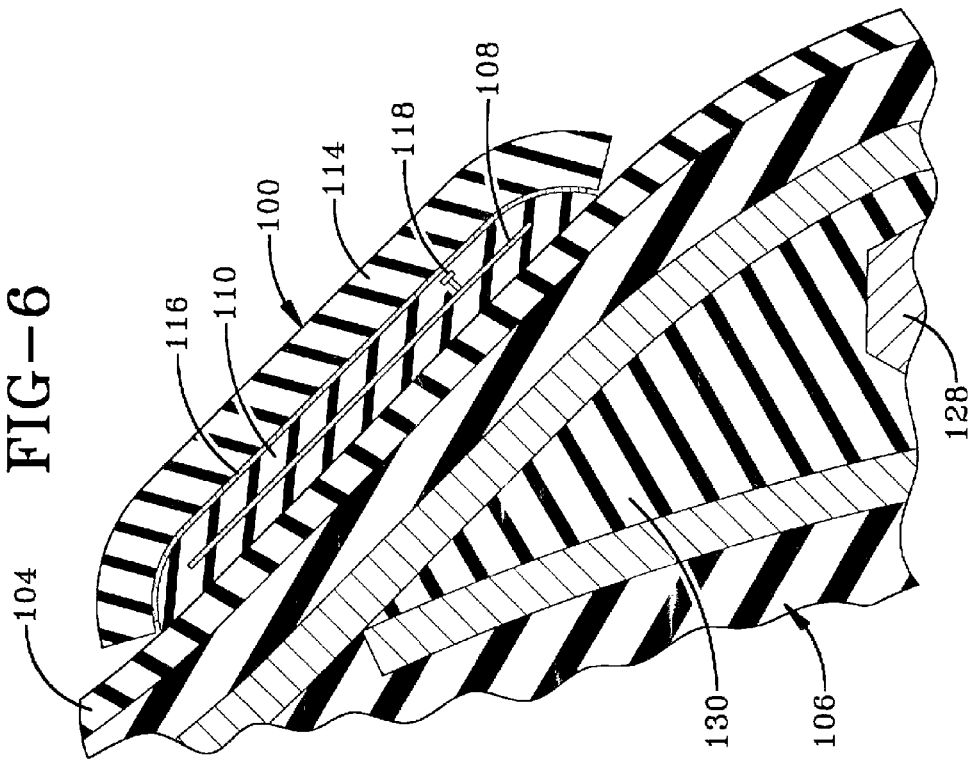
FIG. 6 is a sectional view similar to FIG. 1 showing an alternative embodiment of the present invention.

A first alternative embodiment of the invention is depicted in FIGS. 6 and 7. In the first alternative embodiment, an anchoring patch 100 is used to connect the encapsulated monitoring device 102 to the innerliner 104 of a tire 106. In accordance with one of the objectives of the present invention, an antenna 108 is embedded within an anchoring layer 110 of anchoring patch 100. Communication is provided between antenna 108 and a monitoring device 112 when monitoring device 112 is attached to anchoring layer 110. The communication is provided through electrical coupling.

Anchoring patch 100 includes a cover 114 formed from any of a variety of cured rubbers that is separated from anchoring layer 110 by a layer of cure material 116 such as cure paper or cure cloth. Anchoring layer 110 is fabricated from an uncured rubber that may be a dual cure rubber or a rubber cured either by heat or by a chemical reaction. Examples of anchoring patch 100 and methods for using the patch are taught in U.S. patent application Ser. Nos. 09/206,273 and 09/205,931, filed Dec. 4, 1998. Antenna 108 is connected to an electrical pad 118 that helps provide the electrical coupling between antenna 108 and monitoring device 112. Electrical pad 118 may be an integral part of antenna 108, an extension of antenna 108, or a separate element that is connected to antenna 108. Electrical pad 118 may be positioned adjacent the outer surface of anchoring layer 110.

Encapsulated monitoring device 102 includes monitoring device 112 surrounded by an encapsulation material 120. Encapsulated monitoring device 102 is mounted on an attachment patch 122 that is used to mount encapsulated monitoring device 102 on tire 106. Another electrical pad 124 is disposed in attachment patch 122 and is directly connected to monitoring device 112 by a suitable connector 126. In other embodiments of the invention, the connection between electrical pad 124 and monitoring device 112 is formed by electrical coupling as described above.

As shown in the drawings, the position of antenna 108 may be located away from bead ring 128 and apex filler 130 while allowing monitoring device 112 to be disposed closer to bead ring 128. The length and configuration of antenna 108 is not limited by the overall size of encapsulated monitoring device 102 or attachment pad 122 and may be configured to provide reliable communication with the data-gathering device positioned outside tire 106.

Monitoring device 112 may be mounted on tire 106 in the following manner. First, anchoring patch 100 is adhered to innerliner 104 by a suitable adhesive or by curing anchoring patch 100 to innerliner 104. This cure may be a chemical cure or a heat cure performed during the curing of the green tire. After anchoring patch 100 has been cured, cover 114 and cure material 116 are removed to allow attachment patch 122 carrying encapsulated monitoring device 102 to be directly adhered to anchoring layer 110. Attachment patch 122 may be adhered to anchoring layer 110 by a suitable adhesive or by providing a layer of uncured rubber such as a cushion gum or dual cure rubber on the outer surface of attachment patch 122 which is then cured to anchoring layer 110.

Encapsulated monitoring device 102 is first positioned such that electrical pads 118 and 124 are aligned. Encapsulated monitoring device 102 and attachment patch 122 are then attached to anchoring layer 110. Electrical pads 118 and 124 remain aligned but spaced such that they provide electrical coupling between antenna 108 and electronic monitoring device 112.

A second alternative embodiment of the present invention is depicted in FIG. 8. In the second alternative embodiment, the antenna 200 is embedded within the innerliner 202 of the tire 204. Antenna 200 is embedded within innerliner 202 during the manufacture of innerliner 202 and may be ideally configured to communicate with a data gathering device (not shown) that is positioned outside of tire 204. An electrical pad 206 is connected to antenna 200 and provides communication between antenna 200 and an electronic monitoring device 208. Electrical pad 206 may be an integral part of antenna 200 and simply may be a portion of antenna 200 that is disposed in the correct position to function as electrical pad 206.

Electronic monitoring device 208 is encapsulated with an encapsulation material 210 to form encapsulated monitoring device 212. Encapsulated monitoring device 212 is mounted on attachment patch 214. Another electrical pad 216 is embedded within attachment patch 214 and directly connected to electronic monitoring device 208 by a suitable connector 218. The connection between electrical pad 216 and electronic monitoring device 208 may be the direct connection depicted in FIG. 8 or may be formed by electrical coupling as described above with respect to FIGS. 1-5.

Encapsulated monitoring device 212 is attached to attachment patch 214 by suitable means such as an adhesive. Attachment patch 214 is connected to innerliner 202 by suitable means such as an adhesive. Communication between antenna 200 and electronic monitoring device 208 is provided by aligning electrical pads 206 and 216 and then connecting attachment patch 214 to innerliner 202. Electrical pads 206 and 216 are aligned but spaced to provide electrical coupling through the material of innerliner 202 and attachment patch 214. The electrical coupling provides communication between antenna 200 and electronic monitoring device 208.

A third alternative embodiment of the present invention is indicated generally by the numeral 300 in FIG. 9. Combination 300 includes monitoring device 31 and pneumatic tire 8. Monitoring device 31 may be encapsulated as described above but monitoring device 31 may also be protected in other manners or not protected at all. As described above, pneumatic tire 8 includes an innerliner 12 that defines the inner surface of a sidewall 302 of tire 8. Sidewall 302 thus includes an inner surface 304 and an outer surface 306. At least one body cord 308 is disposed in sidewall 302. Body cord 308 includes a turn up portion 310 that wraps around bead ring 37 and apex filler or bead filler 39. In some embodiments of tire 8, turn up 310 lays back against body cord 308. In other embodiments of the invention, tire 8 may include a turn up 310 that does not extend entirely back against body cord 308. In other embodiments of the invention, tire 8 may include multiple body cords having turn up portions extending at different heights.

In combination 300, monitoring device 31 is connected to inner surface 304 of sidewall 302 with a patch 316 that is formed from suitable rubber or combinations of rubber and other materials that are compatible with and provide desirable adhesion properties with innerliner 12 and monitoring device 31. In other embodiments of the invention, encapsulated monitoring device 31 is connected directly to inner surface 304 and patch 316 is not required. In other embodiments, monitoring device 31 may be embedded in sidewall 302.

Combination 300 includes an antenna 320 mounted to tire 8 in a location spaced from encapsulated monitoring device 31. Antenna 320 communicates with monitoring device 31 through a connector 322. Antenna 320 may be any of a variety of antennas known in the art. For instance, antenna 320 may be a wire, an elongated plate, a coil, or other antenna structures known to those skilled in the art. Antenna 320 may be a monopole antenna or a dipole antenna. Connector 322 may be an electrically conductive material such as a metal wire, a plurality of wires, or a section of conductive polymer disposed within sidewall 302.

The inner end 324 of connector 322 may be connected to monitoring device 31 with a direct connection that is substantially permanent or a removable, reattachable connection such as a plug and socket connection or the coupled connection depicted in FIG. 9. The outer end of connector 322 may be connected to antenna 320 with any of these connection configurations. In the coupled connection, a first coupling element 326 is spaced from a second coupling element 328. First coupling element 326 is connected to connector 322 with second coupling element 328 being connected to monitoring device 31. Coupling elements 326 and 328 are configured to cooperate with each other to allow electrical communication to pass between the elements. Coupling elements 326 and 328 may be plates, coils, wires, or other structures known to those skilled in the art for creating electrical coupling.

In combination 300, antenna 320 is embedded within the body of sidewall 302. Antenna 320 is located outside body cord 308 allowing a larger antenna signal to be transmitted from monitoring device 31 because body cords 308 will not interfere with the signal. Device 31 and antenna 320 may thus operate more effectively and provide for more flexibility in the design of the overall monitoring and reading system. The readers that are located outside of tire 8 may be located in a larger variety of places and still communicate effectively with device 31 because antenna 320 is located outside body cord 308. In combination 300, antenna 320 is embedded within sidewall 302. Antenna 320 may be located closer to outer surface 306 than body cord 308 as depicted in FIG. 9.

In FIG. 9, connector 322 extends under bead ring 37. Connector 322 may thus be substantially parallel to, or follow the general path of, body cord 308 and turn up 310. A portion of connector 322 will thus be disposed between the vehicle rim and bead ring 37 when tire 8 is mounted to the rim. Connector 322 is preferably embedded within the body of sidewall 302 to protect the integrity of connector 322. In other embodiments, connector 322 may be disposed along outer surface 306.

The fourth embodiment of the invention is indicated generally by the numeral 400 in FIG. 10. Combination 400 is similar to combination 300 except that connector 322 extends over turn up 310. Connector 322 thus passes beside or through body cord 308. This configuration protects connector 322 from the friction forces experienced by tire 8 at the interface between tire 8 and the rim. Connector 322 may also extend through bead filler 39 beside both turn up 310 and body cord 308. This alternative configuration is depicted in FIG. 10 and indicated by the numeral 323.

Figure 11:
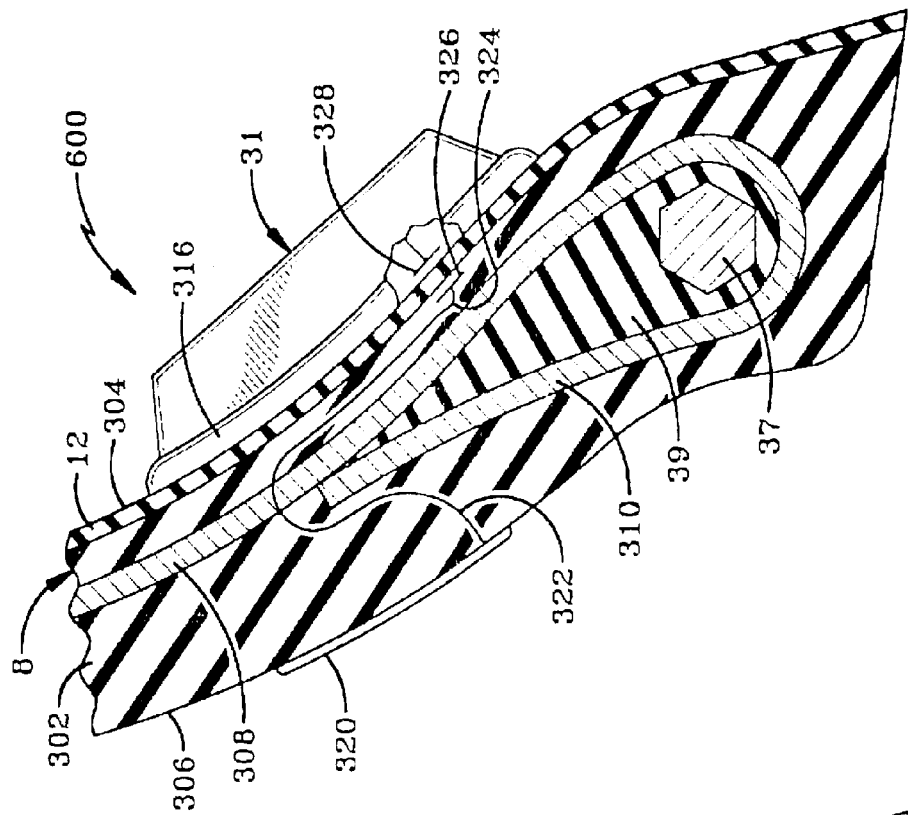
FIG. 11 is a sectional view of the tire sidewall depicting a fifth alternative embodiment of the invention.
Figure 12:
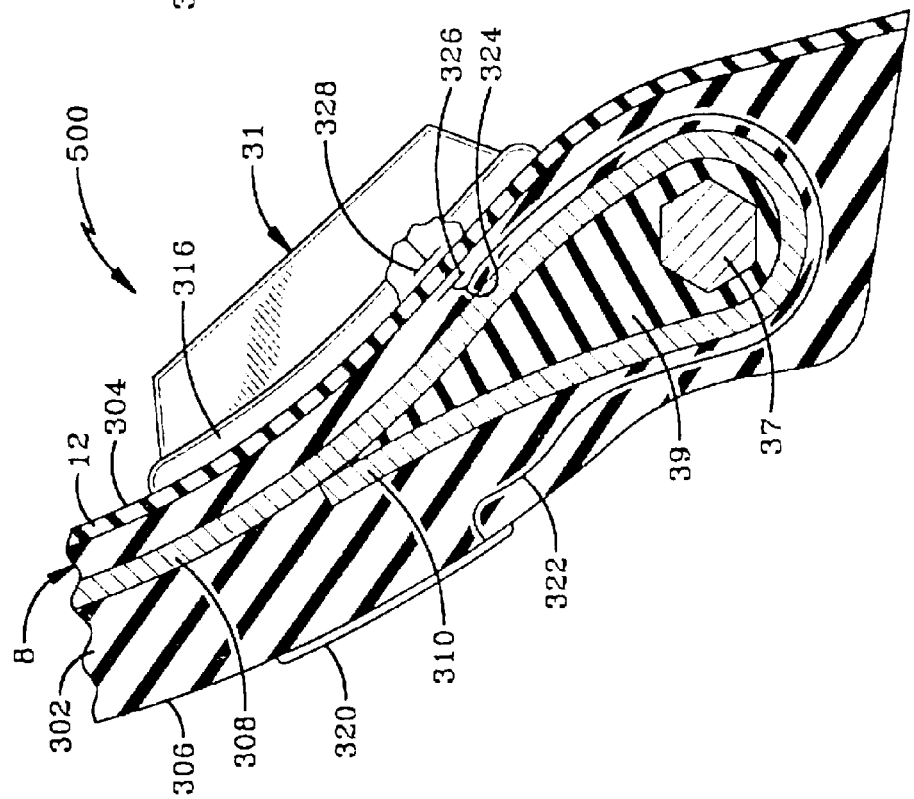
FIG. 12 is a sectional view of the tire sidewall depicting a sixth alternative embodiment of the invention.

The fifth alternative embodiment of the invention is indicated by the numeral 500 in FIG. 11. Combination 500 includes elements similar to combination 300 described above and the same numbers are used to refer to these elements. In combination 500, antenna 320 is mounted to outer surface 306 of sidewall 302. Antenna 320 may be covered by a protective material or may be exposed to the atmosphere surrounding tire 8. In FIG. 11, connector 322 extends under bead ring 37. In FIG. 12, combination 600 is similar to combination 500 except that connector 322 extends over turn up 310.

FIGS. 13 and 14 depict combinations 700 and 800 wherein a plug and socket connector 330 is used to connect monitoring device 31 to connector 322.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A tire for a vehicle; the tire comprising:
a sidewall with at least one body cord, a bead ring, a bead filler, and a body cord turn up disposed in the sidewall;
the sidewall having an inner surface and an outer surface;
an electronic device mounted to the inner surface of the sidewall;
an antenna mounted to the tire sidewall in a location spaced from the electronic device;
a connector providing an electrical connection between the antenna and the electronic device; and
a portion of at least one of the body cord, bead filler, and body cord turn up being disposed intermediate the antenna and the electronic device.

2. The tire of claim 1, wherein the connector passes over the body cord turn up.

3. The tire of claim 1, wherein the connector extends through the bead filler.

4. The tire of claim 1, wherein the connector passes under the bead ring.

5. The tire of claim 1, wherein the antenna is embedded within the sidewall.

6. The tire of claim 1, wherein the antenna is disposed on the outer surface of the sidewall.

7. The tire of claim 1, wherein the connector is electrically coupled to the electronic device to provide electrical communication between the antenna and the electronic device.

8. The tire of claim 7, wherein the connector passes over the body cord turn up.

9. The tire of claim 7, wherein the connector extends through the bead filler.

10. The tire of claim 7, wherein the connector passes under the bead ring.

11. The tire of claim 1, wherein the connector is connected to the electronic device with a detachable plug and socket connection to provide electrical communication between the antenna and the electronic device.

12. The tire of claim 11, wherein the connector passes over the body cord turn up.

13. The tire of claim 11, wherein the connector extends through the bead filler.

14. The tire of claim 11, wherein the connector passes under the bead ring.

15. The tire of claim 1, further comprising a patch mounted to the inner surface of the sidewall; the electronic device being mounted to the patch.

16. The tire of claim 1, wherein the antenna is embedded within the tire sidewall.

17. The tire of claim 1, wherein the antenna is disposed adjacent the outer surface of the sidewall.

18. The tire of claim 1, wherein portions of at least two of the body cord, bead filler, and body cord turn up being disposed intermediate the antenna and the electronic device.

19. A tire for a vehicle; the tire comprising:
a sidewall with a support structure disposed in the sidewall;
the sidewall having an inner surface and an outer surface;
an electronic device mounted to the inner surface of the sidewall;

an antenna mounted to the tire sidewall in a location spaced from the electronic device; the antenna being in electrical communication with the electronic device; and a portion of the support structure being disposed intermediate the antenna and the electronic device.

20. The tire of claim 19, further comprising a connector that provides at least a portion of the electrical communication between the antenna and the electronic device; the connector passing through the support structure of the sidewall.

21. The tire of claim 19, further comprising a connector that provides at least a portion of the electrical communication between the antenna and the electronic device; the connector disposed around the support structure of the sidewall.

22. The tire of claim 19, wherein the antenna is embedded within the sidewall.

23. The tire of claim 19, wherein the antenna is carried by the outer surface of the sidewall.

24. The tire of claim 19, further comprising a connector that provides at least a portion of the electrical communication between the antenna and the electronic device; the connector being physically detached from the electronic device while being electrically coupled to the electronic device to provide electrical communication between the antenna and the electronic device.

25. The tire of claim 19, further comprising a connector that provides at least a portion of the electrical communication between the antenna and the electronic device; wherein the connector is physically connected to the electronic device.

* * * * *